G. H. GUNDERSON.
DRAG FOR MULTIPLE HARROWS.
APPLICATION FILED MAY 4, 1914.

1,154,763.

Patented Sept. 28, 1915.
2 SHEETS—SHEET 1.

Witnesses

Inventor
G H Gunderson
By
Attorneys

G. H. GUNDERSON.
DRAG FOR MULTIPLE HARROWS.
APPLICATION FILED MAY 4, 1914.
1,154,763.
Patented Sept. 28, 1915.
2 SHEETS—SHEET 2.
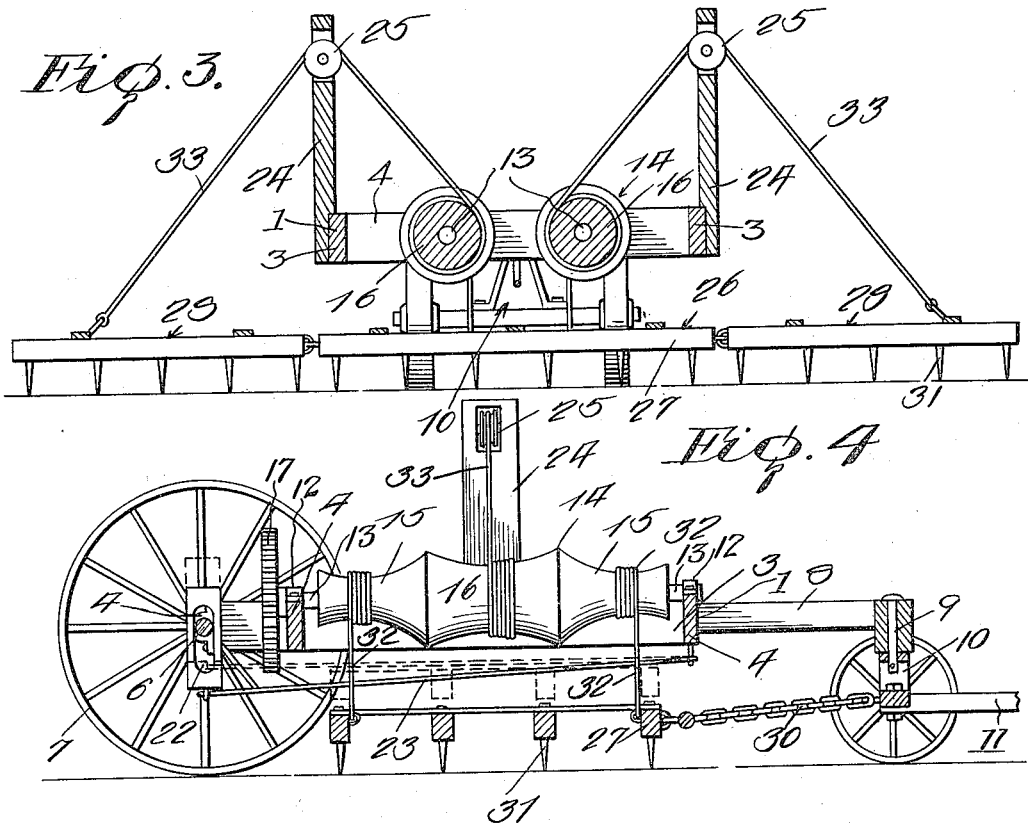
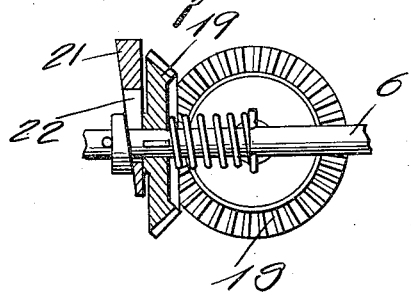
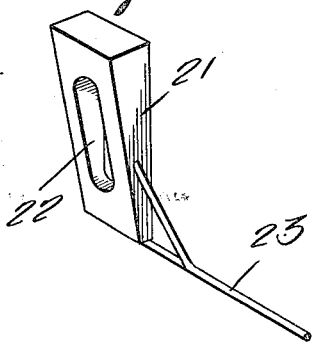
Inventor
G. H. Gunderson
Witnesses
By
Attorneys

UNITED STATES PATENT OFFICE.

GUNDER H. GUNDERSON, OF FAIRCHILD, WISCONSIN.

DRAG FOR MULTIPLE HARROWS.

1,154,763.  Specification of Letters Patent.  Patented Sept. 28, 1915.

Application filed May 4, 1914. Serial No. 836,289.

*To all whom it may concern:*

Be it known that I, GUNDER H. GUNDERSON, a citizen of United States, residing at Fairchild, in the county of Eau Claire, State of Wisconsin, have invented certain new and useful Improvements in Drags for Multiple Harrows; and I do hereby declare the following to be a full, clear, and exact description of the invention, such as will enable others skilled in the art to which it appertains to make and use the same.

The present invention is directed to drags for multiple harrows, and has for its object to so construct a device of this character that a harrow of conventional form can be readily attached to the drag for harrowing.

A further object of the invention is to provide a drag of this nature so constructed that the harrow can be lowered for harrowing and raised when it is desired to remove the harrow from the field.

A still further object of the invention is to provide a drag so constructed that the outer sections of a multiple harrow can be swung upwardly, simultaneously with the upward movement of the intermediate harrow section.

With these and other objects in view, this invention resides in the novel features of construction, formation, combination and arrangement of parts to be hereinafter more fully described, claimed and illustrated in the accompanying drawing, in which :—

Figure 1:
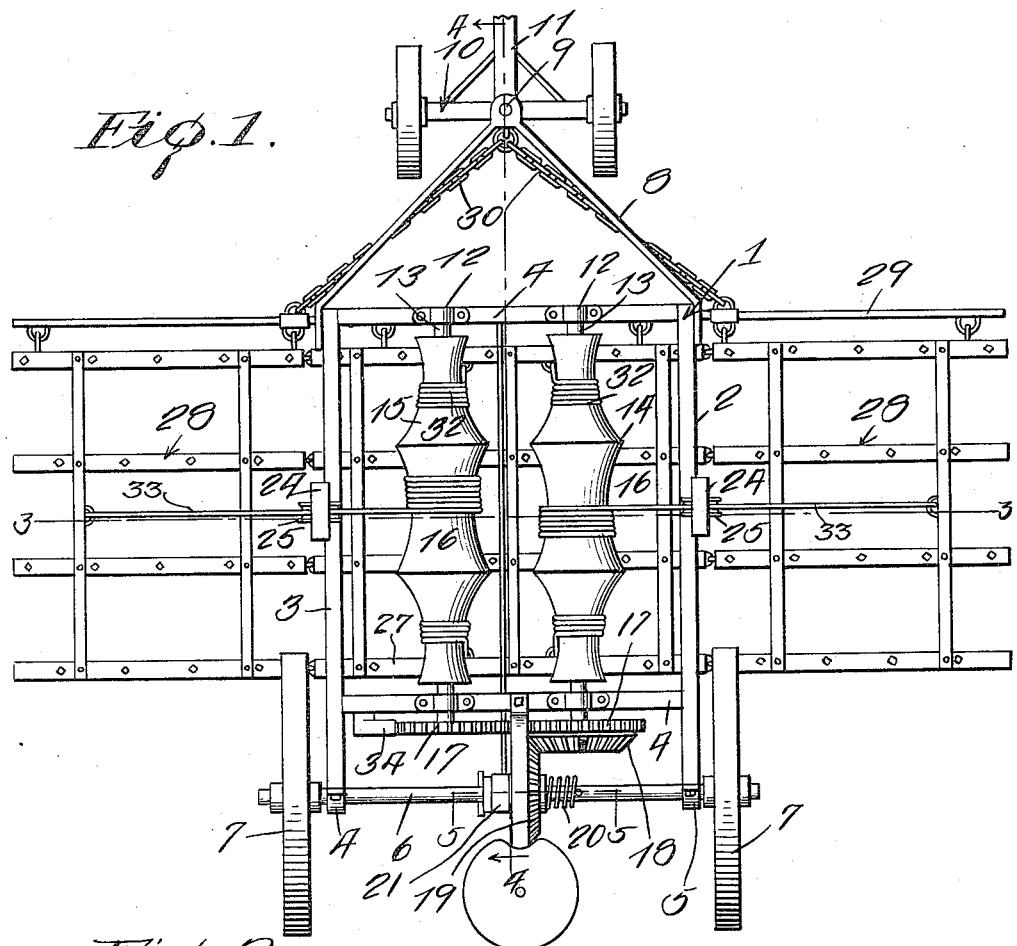
Figure 2:
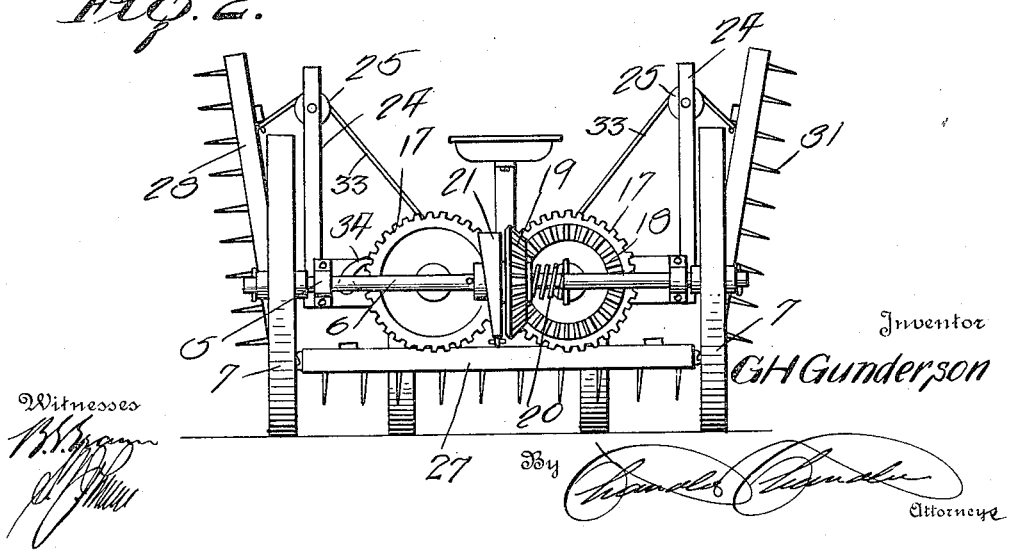

Figure 1 is a top plan view of the device. Fig. 2 is a rear elevation of the device, showing the harrow in its inoperative position. Fig. 3 is a sectional view on line 3—3 of Fig. 1. Fig. 4 is a similar view on line 4—4 of Fig. 1. Fig. 5 is a similar view on line 5—5 of Fig. 1. Fig. 6 is a detail perspective view of the clutch wedge.

Referring to the drawing, the numeral 1 designates the drag which consists of a frame 2 which includes side bars 3 and connecting end bars 4, the side bars 3 having their rear ends prolonged and provided with bearings 5 for rotatably supporting the axle 6 which has fixed to its ends wheels 7. Connected to the forward end of the frame 2 is a draft bar 8 to which is pivotally connected, by the pin 9, the wheeled truck 10, which is provided with a tongue 11 for attaching the draft animals. Mounted upon the end bars 4 and in spaced relation are boxes 12 in which are journaled the ends of the shafts 13, said shafts having fixed thereto drums 14, each of which is formed with outer drum sections 15 and an intermediate drum section 16, the purpose of which will appear later. The rear ends of the shafts 13 have fixed thereto gears 17, which are in mesh and when rotated by the beveled gear 18 fixed to one of said shafts, the drums will rotate toward each other. Splined upon the axle 6 is a beveled gear 19, which is adapted to mesh with the beveled gear 18 when it is desired to rotate the drum, said gear 19 being capable of moving from out of mesh with the beveled gear 18 during the expansion of the coil spring 20 which encircles the axle. The gear 19 is held in mesh with the gear 18 by the wedge clutch 21, which is provided with a longitudinal slot 22 for engagement by the axle 6, said wedge when forced downwardly by placing the foot upon the major end thereof serving to force the gear 19 in mesh with the gear 18, said gears remaining thus as long as pressure is applied upon the wedge.

Having its rear end fixed to the wedge 21 is a rod 23, the forward end of which is pivotally connected to the forward end bar 4, the purpose of which will appear later.

Rising centrally from the side bars 3 of the frame are uprights 24, which have rotatably mounted at their upper ends grooved pulleys 25, the purpose of which will appear later.

The harrow 26 consists of an intermediate section 27 having hingedly connected thereto the outer sections 28, the forward ends of each section being connected to the draw bar 29, which of necessity is formed from hingedly connected sections, said bar being connected to the truck 10 by the chains 30 so that when the device is being drawn across the field the harrow teeth 31 will properly engage the earth.

Having one of their ends fixed to the drum sections 15 are the cords 32, the other ends of which are attached to the intermediate section 27 of the harrow so that when the drums 14 are rotated the intermediate section of the harrow will be lifted from engagement with the ground, and simultaneously therewith the sections 28 of the harrow will be swung upwardly upon the cords 33 winding upon the drum sections 16, said cords being passed over the pulleys 25 and attached to the sections 28.

During the upward movement of the intermediate section 27 of the harrow, the same will contact with the rod 23, whereupon the wedge 21 will be moved upwardly, so that the beveled gear 19 will move from mesh with the gear 18, thus stopping the rotation of the drums, after which the pawl 34 is swung into engagement with one of the gears 17 so as to hold the harrow in its inoperative position.

From the foregoing description it will be seen that when the device is being moved across the field and the harrow is in its operative position, and it is desired to lift the same from the ground it is only necessary for the operator to force the wedge 21 downwardly whereupon the drums will be rotated during the movement of the device until the harrow has reached its proper position, whereupon the wedge will be automatically disengaged so as to stop the rotation of the drums. Thus it will be seen that the harrow can be easily and quickly raised to its inoperative position when it is desired to move the same from place to place.

What is claimed is:—

The combination with a drag including a frame, of shafts rotatably supported upon the frame, drums fixed to the shafts and comprising outer and intermediate drum sections, a wheeled axle supporting the rear of the frame, means carried by the axle for rotating the drums, a harrow disposed under the frame and including an intermediate section and outer sections hingedly connected, cords windable upon the drum sections for moving the intermediate section of the harrow from engagement with the ground simultaneously with the swinging of the outer sections of the harrow from engagement with the ground.

In testimony whereof, I affix my signature, in the presence of two witnesses.

GUNDER H. GUNDERSON.

Witnesses:
W. F. Wood,
Julius Gunderson.